(12) United States Patent
Tsuchiya

(10) Patent No.: US 12,515,392 B2
(45) Date of Patent: Jan. 6, 2026

(54) METHOD AND DEVICE FOR MANUFACTURING RESIN-MADE CONTAINER

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 220 days.

(21) Appl. No.: 17/779,190

(22) PCT Filed: Nov. 25, 2020

(86) PCT No.: PCT/JP2020/043813
§ 371 (c)(1),
(2) Date: May 24, 2022

(87) PCT Pub. No.: WO2021/106929
PCT Pub. Date: Jun. 3, 2021

(65) Prior Publication Data
US 2022/0402189 A1 Dec. 22, 2022

(30) Foreign Application Priority Data

Nov. 25, 2019 (JP) .................................. 2019-212585
Jun. 11, 2020 (JP) ................................. 2020-101661

(51) Int. Cl.
*B29C 49/06* (2006.01)
*B29C 45/16* (2006.01)
(Continued)

(52) U.S. Cl.
CPC .............. *B29C 49/06* (2013.01); *B29C 45/16* (2013.01); *B29C 45/7207* (2013.01); *B29C 49/22* (2013.01); *B29C 49/64* (2013.01); *B29C 49/6427* (2013.01); *B29C 49/6855* (2022.05); *B29C 2045/7214* (2013.01); *B29K 2067/003* (2013.01); *B29L 2031/712* (2013.01)

(58) Field of Classification Search
CPC ... B29C 49/6427; B29C 49/062; B29C 49/06; B29C 45/7207; B29C 49/22;
(Continued)

(56) References Cited

U.S. PATENT DOCUMENTS 4,261,948 A * 4/1981 Krishnakumar ........ B29C 45/26
264/537
4,997,692 A 3/1991 Yoshino
(Continued)

FOREIGN PATENT DOCUMENTS

JP          7-52234 A    2/1995
JP     2000-238116 A    9/2000
(Continued)

OTHER PUBLICATIONS

Office Action issued Sep. 12, 2023 in Japanese family member application No. 2021-561452 with English language translation.
(Continued)

*Primary Examiner* — Monica A Huson
(74) *Attorney, Agent, or Firm* — GREENBLUM & BERNSTEIN, P.L.C.

(57) ABSTRACT

A method for manufacturing a resin container includes: a first injection-molding step of injection-molding a bottomed cylindrical resin intermediate molded body; a second injection-molding step of injection-molding a resin material on an outer side of the intermediate molded body to manufacture a multilayered preform having a resin layer laminated on an outer peripheral side of the intermediate molded body; and a blow-molding step of blow-molding the preform to manufacture a resin container having a thick portion.

10 Claims, 10 Drawing Sheets

(51) Int. Cl.
*B29C 45/72* (2006.01)
*B29C 49/22* (2006.01)
*B29C 49/64* (2006.01)
*B29C 49/68* (2006.01)
*B29K 67/00* (2006.01)
*B29L 31/00* (2006.01)

(58) Field of Classification Search
CPC ... B29C 45/16; B29C 49/071; B29C 49/6855; B29C 2949/22; B29C 49/6445; B29C 2949/0747; B29C 2949/3026; B29C 2949/0818; B29C 2949/3016; B29C 2045/7214; B29C 2949/3034; B29C 49/6435; B29C 2049/4882; B29C 49/6467; B29C 2949/302; B29C 2049/023; B29C 49/643; B29C 49/6454; B29C 2949/0741; B29C 2949/0715; B29C 49/6466; B29C 2949/0746; B29C 49/6465; B29C 2949/3012; B29L 2031/712; B29L 2031/7158; B29K 2067/003
See application file for complete search history.

(56) References Cited

U.S. PATENT DOCUMENTS

| | | | |
|---|---|---|---|
| 6,244,454 | B1 | 6/2001 | Yoshioka et al. |
| 10,144,168 | B2 | 12/2018 | Nakahara |
| 11,220,023 | B2 | 1/2022 | Kawamura et al. |
| 11,318,655 | B2 | 5/2022 | Hong |
| 2008/0251487 | A1 | 10/2008 | Semersky et al. |
| 2012/0118850 | A1* | 5/2012 | Ogata ............... B29C 45/14622 215/371 |
| 2018/0257264 | A1 | 9/2018 | Kawamura et al. |
| 2019/0291331 | A1 | 9/2019 | Hong |

FOREIGN PATENT DOCUMENTS

| | | |
|---|---|---|
| JP | 2011-525880 | 9/2011 |
| JP | 6230173 B2 | 11/2017 |
| KR | 10-1900382 B1 | 9/2018 |
| WO | WO-2008131245 A1 * | 10/2008 ......... B29C 45/1618 |
| WO | 2017/090774 A1 | 6/2017 |

OTHER PUBLICATIONS

Supplementary European Search Report issued Oct. 25, 2023 in European family member application No. 20893618.7.
Office Action issued Apr. 12, 2023 in Chinese family member application No. 202080091101.8.
International Search Report and Written Opinion of the International Searching Authority issued in International Patent Application No. PCT/JP2020/043813, dated Feb. 16, 2021, along with an English translation thereof.
Office Action that issued in corresponding Korean Patent Application No. 10-2022-7019339, dated Jan. 30, 2025, along with English translation thereof.

* cited by examiner

METHOD AND DEVICE FOR MANUFACTURING RESIN-MADE CONTAINER

BACKGROUND OF THE INVENTION

Field of the Invention

The present invention relates to a method and an apparatus for manufacturing a resin container.

Description of the Related Art

The container for storing cosmetics, milky lotions, and the like is required to have an appearance that can be worthy of aesthetic appreciation in order to increase consumer's willingness to purchase. Glass bottles having a heavy feeling and a luxurious feeling and capable of maintaining a beautiful state even when used repeatedly are preferably used for containers for storing this type of cosmetics and the like. However, a glass bottle is heavy and easily broken, and costs for transportation and manufacturing are high. Therefore, it has been studied to replace a glass bottle with a resin container also in a container for storing cosmetics and the like.

Herein, as one of methods for manufacturing a resin container, a hot parison type blow molding method has been conventionally known. In the hot parison type blow molding method, a resin container is blow-molded using residual heat from injection molding of a preform. Therefore, it is advantageous in that it is possible to manufacture a resin container which is diversified and excellent in aesthetic appearance as compared with the cold parison type.

When a resin container is employed as a container for storing cosmetics or the like, it is desirable to mold the resin container into a shape in which the bottom portion is made thick and the body portion is made thin and equalized in order to emphasize a luxurious feeling and a heavy feeling. When a resin container having the above-mentioned wall thickness distribution is molded by a hot parison type blow molding method, a thick preform in which the thickness of the bottom portion is set to be the thickest is applied (see, for example, Japanese Patent No. 6230173.

In general, when a thick preform (for example, a preform having a thick bottom portion) is injection-molded in a hot parison type blow molding method, it is necessary to secure a long injection/cooling time. For example, when the injection time is short (the injection speed is fast), wrinkles may be generated at the bottom portion of the preform, and wrinkle marks may remain at the bottom portion of the container after blow molding. In addition, as the temperature unevenness of the bottom portion of the preform increases, the inner wall surface of the bottom portion of the container after blow molding may have a wavy shape, or sink marks (local recesses) or voids (bubbles) may occur in the bottom portion of the preform.

In addition, when a thick preform is formed of a material that is easily crystallized, such as polyethylene terephthalate (PET), whitening (crystallization) due to insufficient cooling is also likely to occur. As a result, the quality of the container after blow molding may be impaired.

Furthermore, in the hot parison type blow molding method, the rate determining of each step in the molding cycle of the container is defined by the injection/cooling time of the preform. That is, when a thick preform is injection-molded, the injection/cooling time of the preform, which is the rate-determining stage, becomes longer, and thus the molding cycle of the container also becomes longer.

SUMMARY OF THE INVENTION

A method for manufacturing a resin container according to one aspect of the present invention includes: a first injection-molding step of injection-molding a bottomed cylindrical resin intermediate molded body; a second injection-molding step of injection-molding a resin material on an outer side of the intermediate molded body to manufacture a multilayered preform having a resin layer laminated on an outer peripheral side of the intermediate molded body; and a blow-molding step of blow-molding the preform to manufacture a resin container having a thick portion.

Further features of the present invention will become apparent from the following description of exemplary embodiments with reference to the attached drawings.

DESCRIPTION OF THE EMBODIMENTS

Figure 1:
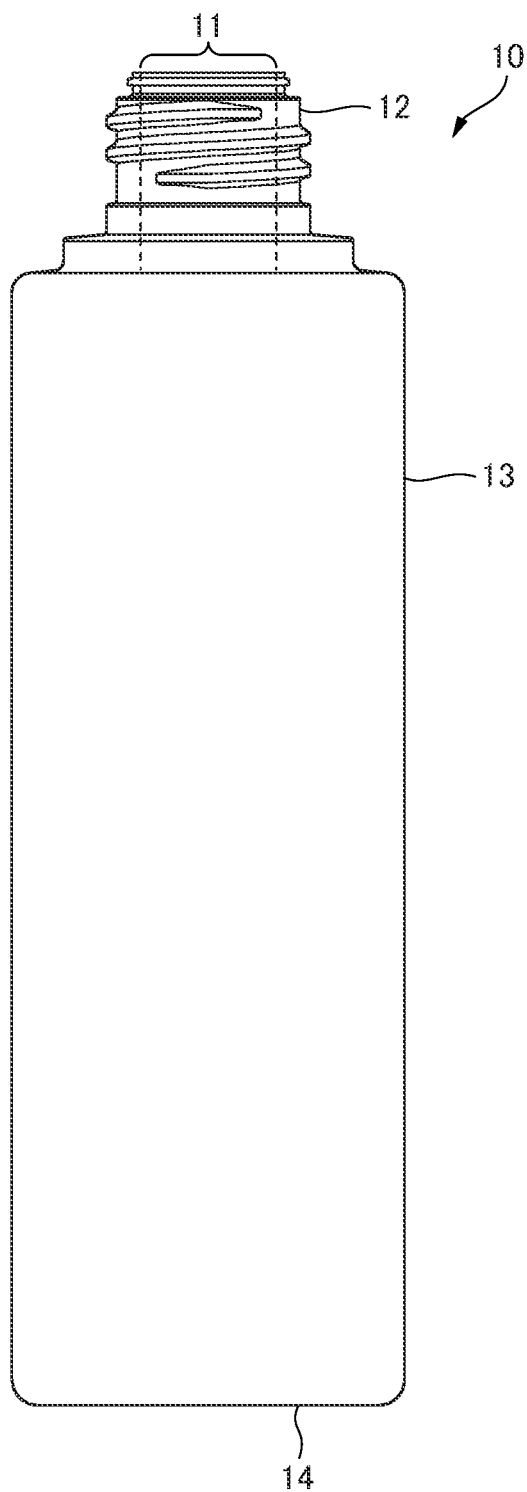
FIG. 1 is a front view of a container according to a first embodiment.

Hereinafter, embodiments of the present invention will be described with reference to the drawings.

In the embodiments, for easy understanding, structures and elements other than the main part of the present invention will be described in a simplified or omitted manner. In addition, in the drawings, the same elements are denoted by the same reference numerals. Note that the shapes, dimensions, and the like of the elements illustrated in the drawings are schematically illustrated, and do not indicate actual shapes, dimensions, and the like.

First Embodiment

<Configuration Example of Resin Container>

First, a configuration example of a resin container (hereinafter, also simply referred to as a container) 10 according to a first embodiment will be described with reference to FIGS. 1 and 2.

Figure 2:
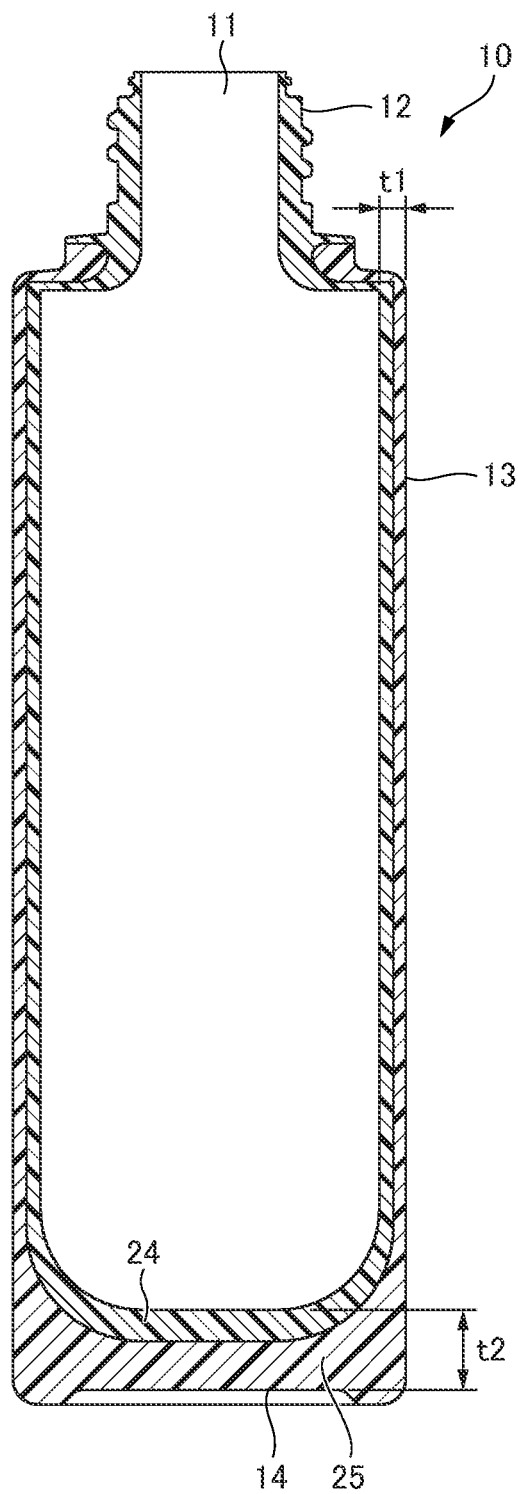
FIG. 2 is a longitudinal sectional view of the container shown in FIG. 1.

FIG. 1 is a front view of a container 10 of the first embodiment, and FIG. 2 is a longitudinal sectional view of the container 10 shown in FIG. 1.

The container 10 illustrated in FIG. 1 is formed of, for example, a resin material such as PET, and stores, for example, a beauty lotion, a milky lotion, and the like. The container 10 includes a neck portion 12 having a mouth portion 11 at an upper end, a cylindrical body portion 13 continuous from the neck portion 12, and a bottom portion 14 continuous from the body portion 13. As illustrated in FIG. 2, a thickness t2 of the bottom portion 14 of the container 10 is formed to be thicker than a thickness t1 of the body portion 13. That is, the thickness t1 of the body portion 13 is formed to be considerably thin with respect to the bottom portion 14, and the thickness of the body portion 13 is equalized.

By forming the container 10 into a shape having the above-described wall thickness distribution, a luxurious feeling and a heavy feeling are emphasized, and the container 10 can be brought close to an image of a cosmetic container held by a consumer. That is, since the aesthetic appearance of the container 10 can be enhanced, the container 10 can be used as a cosmetic container or the like whose appearance is important.

As shown in FIG. 2, the body portion 13 and the bottom portion 14 of the container 10 have a structure in which a first layer facing the container inner surface and a second layer facing the container outer surface are laminated. This structure is formed by blow-molding a preform 20 described later.

<Configuration Example of Preform>

Figure 3A:
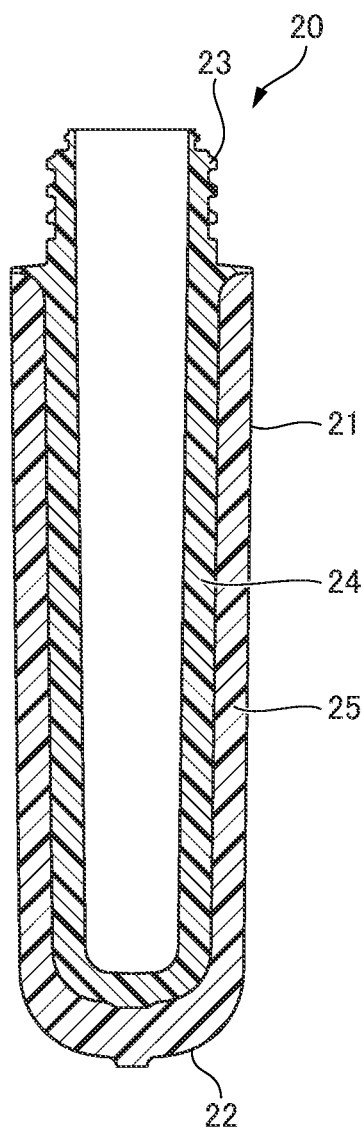
FIG. 3A is a longitudinal sectional view of a preform.
Figure 3B:
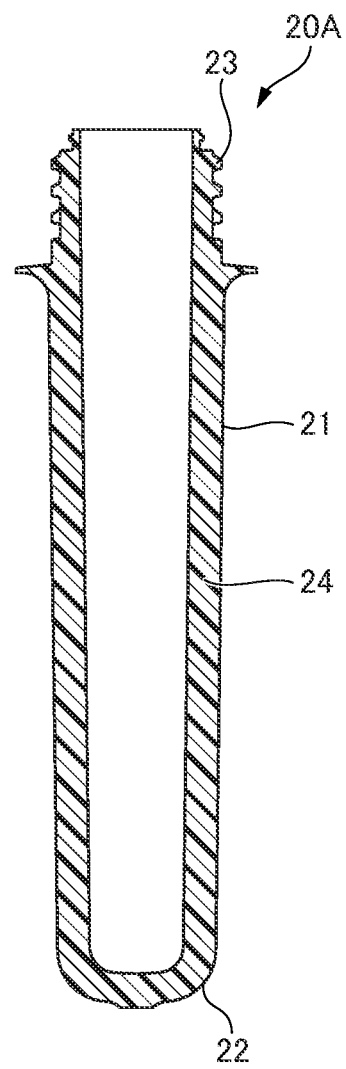
FIG. 3B is a longitudinal sectional view of an intermediate molded body of the preform.

FIGS. 3A and 3B show an example of the preform 20 applied to manufacture of the container 10 of the first embodiment.

FIG. 3A is a longitudinal sectional view of the preform 20, and FIG. 3B is a longitudinal sectional view of an intermediate molded body 20A of the preform 20.

The entire shape of the preform 20 is a bottomed cylindrical shape in which one end side is opened and the other end side is closed. The preform 20 includes a body portion 21 formed in a cylindrical shape, a bottom portion 22 that closes the other end side of the body portion 21, and a neck portion 23 formed in an opening on one end side of the body portion 21.

In addition, the preform 20 has a structure in which a first layer 24 located on an inner peripheral side and a second layer 25 located on an outer peripheral side are laminated. The neck portion 23 is formed of a material of the first layer 24, but in the body portion 21 and the bottom portion 22, the second layer 25 is laminated on the outer periphery of the first layer 24.

The preform 20 in FIG. 3A is formed as follows. First, the intermediate molded body 20A (FIG. 3B) having the body portion 21, the bottom portion 22, and the neck portion 23 is injection-molded using the material of the first layer 24. Thereafter, the material of the second layer 25 is further injection-molded on the outer peripheries of the body portion 21 and the bottom portion 22 of the intermediate molded body 20A to form the preform 20.

Here, the compositions of the materials of the first layer 24 and the second layer 25 may be the same or different. For example, the same resin material may be used for the first layer 24 and the second layer 25, or different materials may be used. Furthermore, for example, the amount of coloring material (color shade), the type of coloring material (color type), and the like may be changed for each material of the first layer 24 and the second layer 25. Note that the first layer 24 or the second layer 25 may have a property of transmitting light (translucency).

In addition, the dimensions and specifications of the preform 20, for example, the thicknesses of the first layer 24 and the second layer 25 can be appropriately changed corresponding to the shape of the container 10 to be manufactured.

In the example of FIG. 3A, the thickness of the bottom portion 22 and the thickness of the body portion 21 are substantially the same in the first layer 24, but the thickness of the bottom portion 22 is set to be thicker than the thickness of the body portion 21 in the second layer 25. As a result, the thickness of the bottom portion 22 is thicker than the thickness of the body portion 21 as a whole of the preform 20. For example, the thickness of each layer of the preform is set to 10 mm or less. In addition, the thickness of the bottom portion of the first layer 24 is set to about 3.5 mm, and the thickness of the bottom portion of the second layer 25 is set to about 6.5 mm. Note that the length of the preform 20 (the length from the upper end of the neck portion 23 to the lower end of the second layer 25 of the bottom portion 22) is desirably set to be longer than that of the container 10.

<Description of Apparatus for Manufacturing Container>

Figure 4:
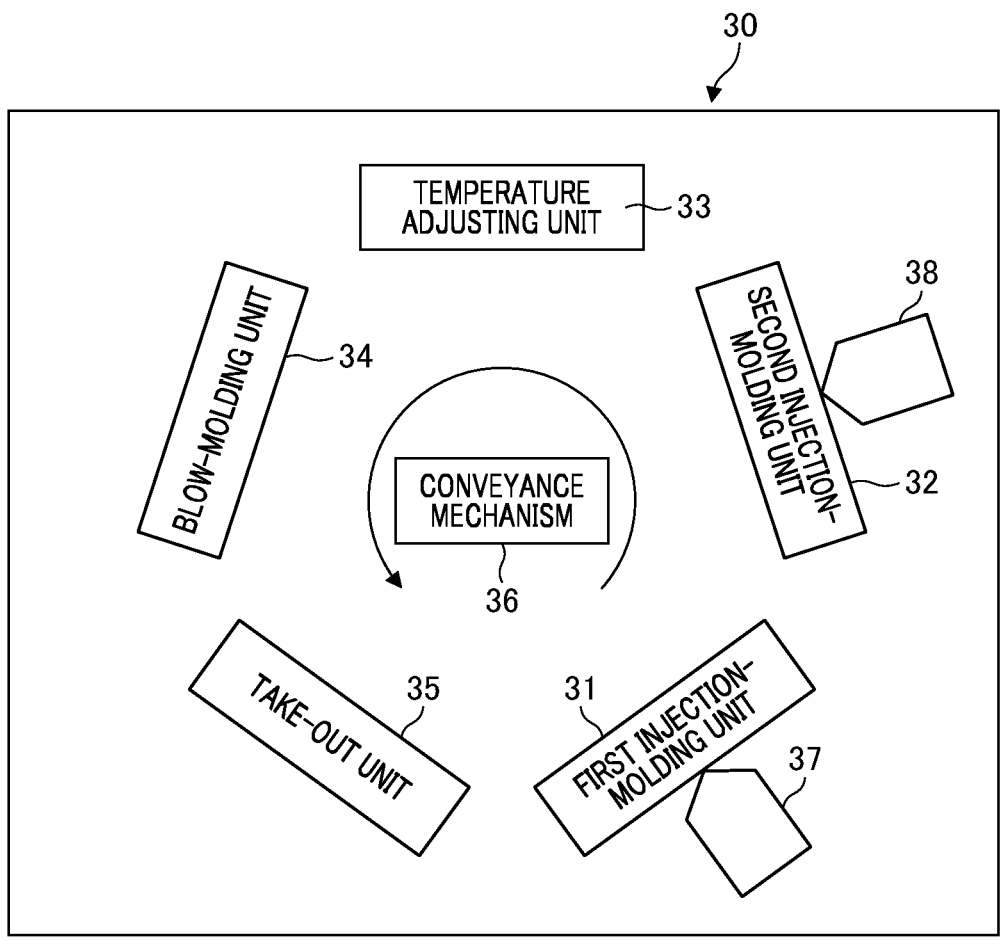
FIG. 4 is a diagram schematically illustrating a configuration of a blow-molding apparatus according to the first embodiment.

FIG. 4 is a diagram schematically illustrating a configuration of a blow-molding apparatus 30 according to the first embodiment. The blow-molding apparatus 30 according to the first embodiment is an example of a container manufacturing apparatus, and employs a hot parison method (also referred to as a one-stage method) for blow-molding a container by utilizing residual heat (internal heat quantity) from injection molding without cooling the preform 20 to room temperature.

The blow-molding apparatus 30 includes a first injection-molding unit 31, a second injection-molding unit 32, a temperature adjusting unit 33, a blow-molding unit 34, a take-out unit 35, and a conveyance mechanism 36. The first injection-molding unit 31, the second injection-molding unit 32, the temperature adjusting unit 33, the blow-molding unit 34, and the take-out unit 35 are arranged at positions rotated by a predetermined angle (for example, 72 degrees) about the conveyance mechanism 36. Note that the blow-molding apparatus 30 may further include a temperature adjusting unit capable of heating or cooling only the first layer 24 of the preform 20 between the first injection-molding unit 31 and the second injection-molding unit 32. In this case, each molding station is disposed at a position rotated by 60 degrees about the conveyance mechanism 36.

(Conveyance Mechanism 36)

The conveyance mechanism 36 includes a rotary plate (not illustrated) that rotates about an axis in a direction perpendicular to the paper surface of FIG. 4. On the rotary plate, one or more neck molds (not illustrated) for holding the neck portion 23 of the preform 20 (or the neck portion 12 of the container 10) are arranged at each predetermined angle. The conveyance mechanism 36 conveys the preform 20 (or the container 10) having the neck portion 23 held by the neck mold in the order of the first injection-molding unit 31, the second injection-molding unit 32, the temperature adjusting unit 33, the blow-molding unit 34, and the take-out unit 35 by rotating the rotary plate. Note that the conveyance mechanism 36 can also move the rotary plate up and down, and also performs operations related to mold closing and mold opening (releasing) in the first injection-molding unit 31 and the second injection-molding unit 32.

(First Injection-Molding Unit 31)

The first injection-molding unit 31 includes an injection cavity mold and an injection core mold (not illustrated), and manufactures the intermediate molded body 20A of the preform 20 illustrated in FIG. 3B. A first injection device 37 that supplies a raw material (resin material) of the first layer 24 of the preform 20 is connected to the first injection-molding unit 31.

In the first injection-molding unit 31, the injection cavity mold, the injection core mold, and the neck mold of the conveyance mechanism 36 are closed to form a mold space for the intermediate molded body 20A. Then, by pouring the resin material from the first injection device 37 into the mold space, the intermediate molded body 20A corresponding to the first layer 24 of the preform 20 is manufactured in the first injection-molding unit 31.

Here, the raw material of the first layer 24 is a thermoplastic synthetic resin, and can be appropriately selected depending on the specification of the container 10. Specific examples of the material include PET, PEN (polyethylene naphthalate), PCTA (polycyclohexanedimethylene terephthalate), Tritan (Tritan (registered trademark): copolyester manufactured by Eastman Chemical), PP (polypropylene), PE (polyethylene), PC (polycarbonate), PES (polyethersulfone), PPSU (polyphenylsulfone), PS (polystyrene), COP/COC (cyclic olefin polymer), PMMA (polymethyl methacrylate: acrylic), and PLA (polylactic acid). In addition, an additive such as a coloring material may be added to the resin material.

Even when the mold of the first injection-molding unit 31 is opened, the neck mold of the conveyance mechanism 36 is not opened, and the conveyance mechanism 36 holds and conveys the intermediate molded body 20A as it is. The number of the intermediate molded bodies 20A simultaneously molded by the first injection-molding unit 31 (that is, the number of containers 10 that can be simultaneously molded by the blow-molding apparatus 30) can be appropriately set.

(Second Injection-Molding Unit 32)

The second injection-molding unit 32 includes an injection cavity mold (not illustrated), and injection-molds the second layer 25 on the outer peripheral portion of the intermediate molded body 20A. A second injection device 38 that supplies a raw material (resin material) of the second layer 25 of the preform 20 is connected to the second injection-molding unit 32. The second injection-molding unit 32 may include an injection core mold (not illustrated).

In the second injection-molding unit 32, after the intermediate molded body 20A is stored in the injection cavity mold, a resin material is injected from the second injection device 38 between the outer periphery of the intermediate molded body 20A and the injection cavity mold. As a result, in the second injection-molding unit 32, the second layer 25 is formed on the outer peripheral portion of the intermediate molded body 20A, and the preform 20 in FIG. 3A is manufactured. Before injection of the resin material, the injection core mold may be inserted so as to be in contact with the inner periphery of the intermediate molded body 20A.

The raw material of the second layer 25 is a thermoplastic synthetic resin, and the specific type of the material is the same as the description of the raw material of the first layer 24. The composition of the raw material of the second layer 25 may be the same as or different from that of the first layer 24. For example, the same resin material may be used for the first layer 24 and the second layer 25, or different materials may be used. Furthermore, for example, the amount of coloring material, the type of coloring material, and the like may be changed for each material of the first layer 24 and the second layer 25.

(Temperature Adjusting Unit 33)

The temperature adjusting unit 33 equalizes the temperature and removes uneven temperature of the preform 20 conveyed from the second injection-molding unit 32, and adjusts the temperature of the preform 20 to a temperature suitable for final blowing (for example, about 90° C. to 105° C.). The temperature adjusting unit 33 also has a function of cooling the preform 20 in a high temperature state after injection molding.

Figure 5:
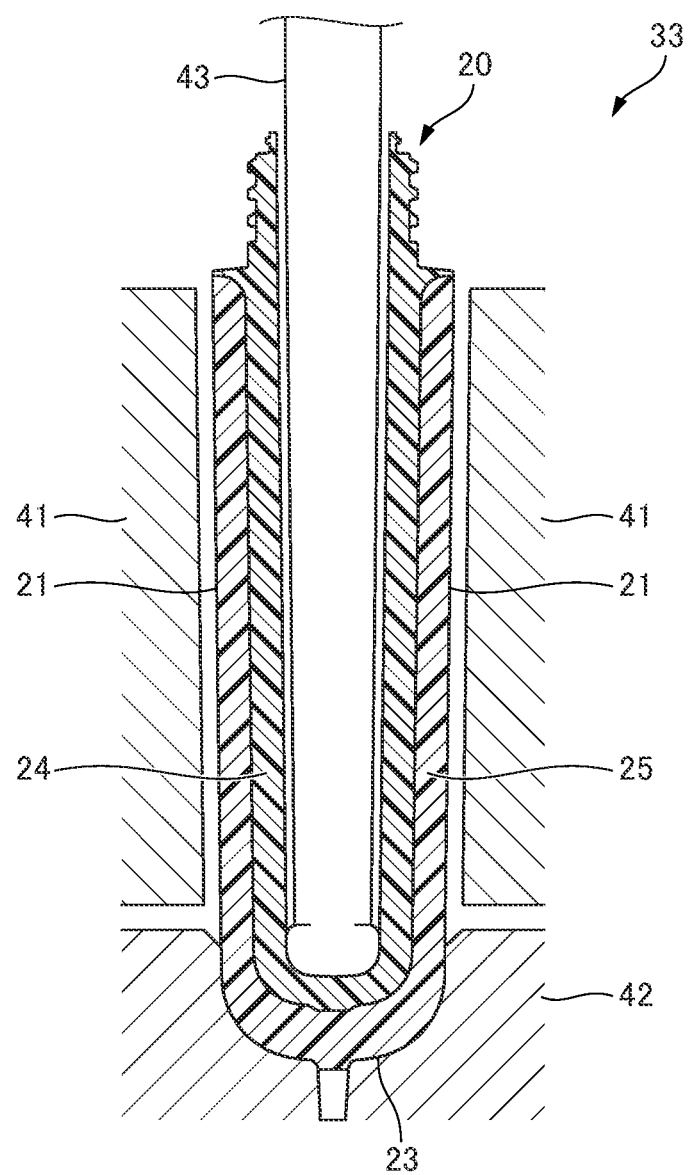
FIG. 5 is a diagram illustrating a configuration example of a temperature adjusting unit.

FIG. 5 is a diagram illustrating a configuration example of the temperature adjusting unit 33. The temperature adjusting unit 33 includes a first mold (heating pot 41) that stores the body portion 21 of the preform 20, a second mold (temperature adjusting pot 42) that faces the bottom portion 22 of the preform 20, and a third mold (temperature adjusting rod 43) that is inserted into the preform 20.

The heating pot 41 is provided with a heating member (band heater or the like), and a flow path (not illustrated) through which a temperature adjusting medium (cooling medium) flows is formed inside each of the temperature adjusting pot 42 and the temperature adjusting rod 43. Therefore, each mold of the temperature adjusting unit 33 is maintained at a predetermined temperature by the heating member and the temperature adjusting medium flowing inside.

The temperature of the heating pot 41 is set to a temperature (for example, 280° C. to 330° C.) higher than the temperatures (for example, 20° C. to 60° C.) of the temperature adjusting pot 42 and the temperature adjusting rod 43. Therefore, the body portion 21 of the preform 20 facing the heating pot 41 is adjusted to a higher temperature (for example, 100° C. to 120° C.) than the bottom portion 22.

In addition, the temperature adjusting rod 43 has a shape in which a tip portion facing the bottom portion 22 of the preform 20 is wider in the radial direction than a shaft portion facing the body portion 21 of the preform 20. The temperature adjusting rod 43 has a function of pressing the preform 20 toward the temperature adjusting pot 42 and pressing the bottom portion 22 of the preform 20 against the temperature adjusting pot 42. An annular gap is generated between the temperature adjusting rod 43 and the inner periphery of the body portion 21, and the body portion 21 of the preform 20 is not in direct contact with the temperature adjusting rod 43. In addition, an annular gap is also provided between the heating pot 41 and the outer periphery of the body portion 21, and the body portion 21 of the preform 20 is not in direct contact with the heating pot 41.

As a result, when the preform 20 is placed in the temperature adjusting unit 33, the bottom portion 22 of the preform 20 is sandwiched between the temperature adjusting pot 42 and the temperature adjusting rod 43 to be cooled by contact, and the temperature of the bottom portion 22 and the vicinity thereof is adjusted to a temperature lower than that of the body portion 21. On the other hand, the body portion 21 is adjusted to a temperature higher than that of the bottom portion 22 by radiation heat from the heating pot 41, and is heated to a temperature at which the body portion is easily blown (stretched).

(Blow-Molding Unit 34)

The blow-molding unit 34 blow-molds the preform 20 whose temperature has been adjusted by the temperature adjusting unit 33 to manufacture the container 10.

The blow-molding unit 34 includes a blow cavity mold which is a pair of split molds corresponding to the shape of the container 10, a bottom mold, a stretching rod, and an air introduction member (all not illustrated). The blow-molding unit 34 blow-molds the preform 20 while stretching the preform. As a result, the preform 20 is shaped into a shape of the blow cavity mold, and the container 10 can be manufactured.

(Take-Out Unit 35)

The take-out unit 35 is configured to open the neck portion 12 of the container 10 manufactured by the blow-molding unit 34 from the neck mold and take out the container 10 to the outside of the blow-molding apparatus 30.

<Description of Method for Manufacturing Container>

Figure 6:
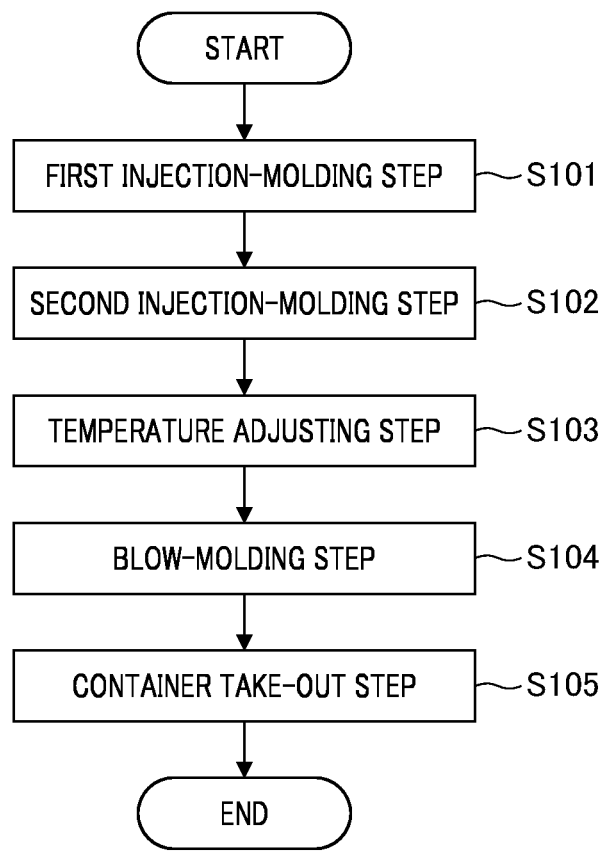
FIG. 6 is a flowchart showing steps of a method for manufacturing a container.

Next, a method for manufacturing a container by the blow-molding apparatus 30 of the first embodiment will be described. FIG. 6 is a flowchart showing steps of the method for manufacturing a container.

(Step S101: First Injection-Molding Step)

First, in the first injection-molding unit 31, the resin material is injected from the first injection device 37 into the mold space of the intermediate molded body 20A formed by the injection cavity mold, the injection core mold, and the neck mold of the conveyance mechanism 36, so that the intermediate molded body 20A corresponding to the first layer 24 of the preform 20 is manufactured.

Thereafter, when the first injection-molding unit 31 is opened, the rotary plate of the conveyance mechanism 36 rotates by a predetermined angle, and the intermediate molded body 20A held by the neck mold is conveyed to the second injection-molding unit 32 in a state of containing residual heat from injection molding.

(Step S102: Second Injection-Molding Step)

In the second injection-molding unit 32, after the intermediate molded body 20A is stored inside the injection cavity mold, a resin material is injected from the second injection device 38 between the outer periphery of the intermediate molded body 20A and the injection cavity mold. As a result, the second layer 25 is formed on the outer peripheral portion of the intermediate molded body 20A, and the preform 20 is manufactured.

Thereafter, when the second injection-molding unit 32 is opened, the rotary plate of the conveyance mechanism 36 rotates by a predetermined angle, and the preform 20 held in the neck mold is conveyed to the temperature adjusting unit 33 in a state of containing residual heat from injection molding.

(Step S103: Temperature Adjusting Step)

Subsequently, the temperature adjusting unit 33 performs temperature adjustment for bringing the temperature of the preform 20 close to a temperature suitable for the final blowing.

In the temperature adjusting unit 33, the preform 20 is disposed (stored) in the heating pot 41 and the temperature adjusting pot 42, and the temperature adjusting rod 43 is inserted into the preform 20. Thereafter, the temperature adjusting rod 43 presses the preform 20 toward the temperature adjusting pot 42, and the bottom portion 22 of the preform 20 is pressed against the temperature adjusting pot 42.

At this time, the bottom portion 22 of the preform 20 is sandwiched between the temperature adjusting pot 42 and the temperature adjusting rod 43 and is contact-cooled. On the other hand, the body portion 21 of the preform 20 is temperature-adjusted by receiving the heat of the heating pot 41 facing the body portion 21. As a result, the temperature of the bottom portion 22 of the preform 20 is adjusted to a temperature lower than that of the body portion 21. That is, the body portion 21 of the preform 20 has a large amount of residual heat, and the bottom portion 22 of the preform 20 and the vicinity thereof have a small amount of residual heat.

Thereafter, the rotary plate of the conveyance mechanism 36 rotates by a predetermined angle, and the preform 20 after the temperature adjustment held in the neck mold is conveyed to the blow-molding unit 34.

(Step S104: Blow-Molding Step)

Subsequently, the blow molding of the container 10 is performed in the blow-molding unit 34.

First, by closing the blow cavity mold and the bottom mold, storing the preform 20 in the mold space, and lowering the air introduction member (blow core), the air introduction member is brought into contact with the neck portion 23 of the preform 20. Then, the stretching rod is lowered to hold the bottom portion 22 of the preform 20 from the inner surface, and blow air is supplied from the air introduction member while vertical axis stretching is performed as necessary, and thereby the preform 20 is subjected to horizontal axis stretching. As a result, the preform 20 is bulged and shaped so as to be in close contact with the mold space of the blow cavity mold, and is blow-molded to the container 10. When the preform 20 is longer than the container 10, the bottom mold is made to stand by at a lower position not in contact with the bottom portion 22 of the preform 20 before closing the blow cavity mold, and is quickly raised to the molding position after closing the mold.

In the blow molding of the hot-parison method, the preform 20 is more easily deformed as the internal heat quantity of the preform 20 is larger. As described above, while the body portion 21 of the preform 20 facing the heating pot 41 is in a state of having a large amount of residual heat, the bottom portion 22 of the preform 20 and the vicinity thereof that have been contact-cooled by the temperature adjusting pot 42 are in a state of having a small amount of residual heat. That is, in the preform 20, the body portion 21 having a larger internal heat quantity is more easily deformed than the bottom portion 22.

Therefore, when the blow air is supplied to the preform 20, the body portion 21 having a large internal heat quantity is stretched earlier, and the bottom portion 22 having a small internal heat quantity is stretched later. This makes it difficult for the bottom portion 22 of the preform 20 to be stretched, so that the bottom portion 14 of the container 10 shaped by blow molding can be made thick.

(Step S105: Container Take-Out Step)

When the blow molding is completed, the blow cavity mold is opened. As a result, the container 10 is movable from the blow-molding unit 34.

Subsequently, the rotary plate of the conveyance mechanism 36 rotates by a predetermined angle, and the container 10 is conveyed to the take-out unit 35. In the take-out unit 35, the neck portion 12 of the container 10 is opened from the neck mold, and the container 10 is taken out to the outside of the blow-molding apparatus 30.

Thus, one cycle in the method for manufacturing the container ends. Thereafter, by rotating the rotary plate of the conveyance mechanism 36 by a predetermined angle, the steps of S101 to S105 described above are repeated. During the operation of the blow-molding apparatus 30, five sets of containers having a time difference of one step are manufactured in parallel.

Further, due to the structure of the blow-molding apparatus 30, times of the first injection-molding step, the second injection-molding step, the temperature adjusting step, the blow-molding step, and the container take-out step are the same. Similarly, the conveyance time between the respective steps is the same.

As described above, in the first embodiment, the intermediate molded body 20A corresponding to the first layer 24 of the preform 20 is injection-molded in the first injection-molding step, and the second layer 25 is injection-molded on the outer peripheral portion of the intermediate molded body 20A in the second injection-molding step to manufacture the multilayered preform 20. Then, in the blow-molding step, the preform 20 is blow-molded to manufacture the container 10 in which the thickness t2 of the container bottom portion is thicker than the thickness t1 of the container body portion.

When the thick container 10 suitable for a cosmetic container or the like is manufactured by a hot parison type blow molding method, it is necessary to use a thick preform corresponding to the thickness of the container bottom portion. In the first embodiment, the thick preform 20 is manufactured through two injection-molding steps. Therefore, the injection/cooling time in each of the first injection-molding step and the second injection-molding step is shorter than the injection/cooling time in molding the thick preform in one injection-molding step. As a result, since the injection/cooling time of the preform, which is the rate-determining stage, is shortened, the molding cycle can be shortened when the thick container 10 suitable for a cosmetic container or the like is manufactured.

In the first embodiment, since the thick preform 20 is manufactured through two injection-molding steps, the difficulty of molding in each of the first injection-molding step and the second injection-molding step is reduced as compared with the case where the thick preform is molded in one injection-molding step. Therefore, the occurrence of wrinkles and temperature unevenness at the bottom portion of the preform can be suppressed, and the quality of the container 10 to be blow-molded can be improved. In addition, whitening (crystallization) due to insufficient cooling is relatively less likely to occur due to cooling in the mold in the first injection-molding step and the second injection-molding step, so that the quality of the container 10 to be blow-molded can be improved. Furthermore, in the first embodiment in which two injection-molding steps are performed, the bottom portion 22 of the preform 20 can be formed to be thicker and the bottom portion 14 of the container 10 can also be formed to be thicker as compared with a case where only one injection-molding step is performed.

In the temperature adjusting step of the first embodiment, the bottom portion 22 of the preform 20 is brought into contact with the temperature adjusting pot 42 adjusted to a temperature lower than that of the heating pot 41 facing the body portion 21 of the preform 20 to cool the bottom portion 22 of the preform 20. As a result, since the distribution of the internal heat quantity of the preform 20 can be adjusted to an appropriate state before blow molding, the container 10 in which the thickness t2 of the container bottom portion is thicker than the thickness t1 of the container body portion can be favorably manufactured.

In the first embodiment, since the thick preform 20 is manufactured through two injection-molding steps, the composition of the material of the first layer 24 on the inner peripheral side of the preform 20 and the composition of the material of the second layer 25 on the outer peripheral side can be made different. As a result, it is possible to suppress the manufacturing cost of the container 10 and to manufacture the container 10 having high designability.

For example, when the container 10 is internally colored with a coloring material, the manufacturing cost can be reduced by suppressing the addition amount of the coloring material of the first layer 24 or the second layer 25. For example, the coloring material may be added only to the material of the first layer 24.

In addition, the designability of the container 10 may be improved by changing the combination of color or pattern between the first layer 24 and the second layer 25. In addition, a difference in refractive index may be generated between the first layer 24 and the second layer 25, and light scattering due to internal reflection may occur at the interface between the first layer 24 and the second layer 25.

EXAMPLES

Hereinafter, Examples of the present invention will be described in comparison with Comparative Examples.

Figure 7:
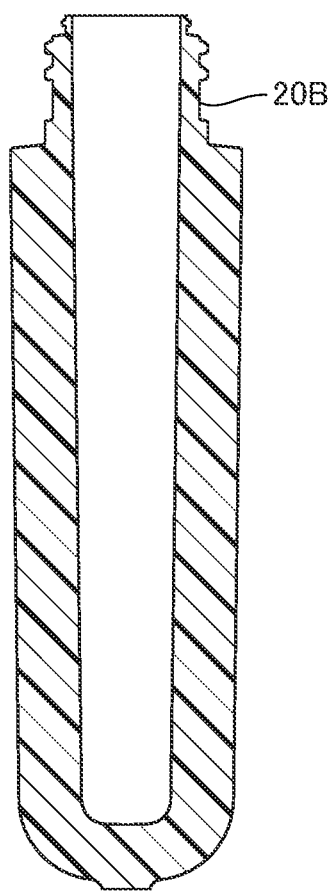
FIG. 7 is a longitudinal sectional view of a preform of a comparative example.

In Examples, similarly to the above embodiment, an intermediate molded body of a preform corresponding to the first layer was formed in the first injection-molding step, and the second layer was injection-molded on the outer periphery of the intermediate molded body in the second injection-molding step to obtain a preform having a two-layer structure. The longitudinal cross-sectional shape of the preform of Examples is similar to that of FIG. 3A. On the other hand, in Comparative Examples, a thick preform 20B shown in FIG. 7 was injection-molded in one injection-molding step. The first layer 24 and the second layer 25 of the preform 20 of Examples were molded using the same material, specifically, a PET resin (IP252BB1 or PIFG30) manufactured by BELLPOLY PRODUCTS CO., LTD.

The injection time in the first injection-molding step in Examples was 13 seconds, and the cooling time in the first injection-molding step was 9 seconds. The injection time in the second injection-molding step in Examples was 14 seconds, and the cooling time in the second injection-molding step was 8 seconds. The injection weights of the PET resin in the first injection-molding step and the second injection-molding step were 24 grams and 33 grams, respectively, and the total injection weight was 57 grams.

On the other hand, the injection time in the injection-molding step of Comparative Examples was 40 seconds, and the cooling time in the injection-molding step was 7 seconds. The injection weight of the PET resin in the injection-molding step of Comparative Examples was 57 grams.

In the blow-molding apparatus to which the preform of Examples is applied, as in the above embodiment, it is assumed that the first injection-molding step, the second injection-molding step, the temperature adjusting step, the blow-molding step, and the container take-out step are performed by different devices (five-station method). In this case, the step having the longest required time among the above five steps is rate-determining, and the time of one step of the molding cycle is defined. When the first injection-molding step and the second injection-molding step are compared, the sum (22 seconds) of the injection time (14 seconds) and the cooling time (8 seconds) in the second injection-molding step and the time (4 seconds) of the dry cycle are added to obtain the time (26 seconds) of the molding cycle in Examples.

On the other hand, in the blow-molding apparatus to which the preform 20B of Comparative Examples is applied, it is assumed that the injection-molding step, the temperature adjustment step, the blow-molding step, and the container take-out step are performed by different devices (four-station method). In this case, the step having the longest required time among the above four steps is rate-determining, and the time of one step of the molding cycle is defined. For example, the sum (47 seconds) of the injection time (40 seconds) and the cooling time (7 seconds) in the injection-molding step and the time (4 seconds) of the dry cycle are added to obtain the time (51 seconds) of the molding cycle in Comparative Examples.

From the above, when comparing Examples and Comparative Examples assuming that the dry cycle is the same time, it can be seen that the time of the molding cycle of Examples can be shortened by 25 seconds as compared with Comparative Examples.

Second Embodiment

A second embodiment is a modification of the first embodiment, and shows a configuration example of a container in which a plurality of grooves extending in an axial direction is formed on an outer peripheral surface of a container body portion. In the following description of the second embodiment, the same elements as those of the first embodiment are denoted by the same reference numerals, and redundant description will be omitted.

Figure 8A:
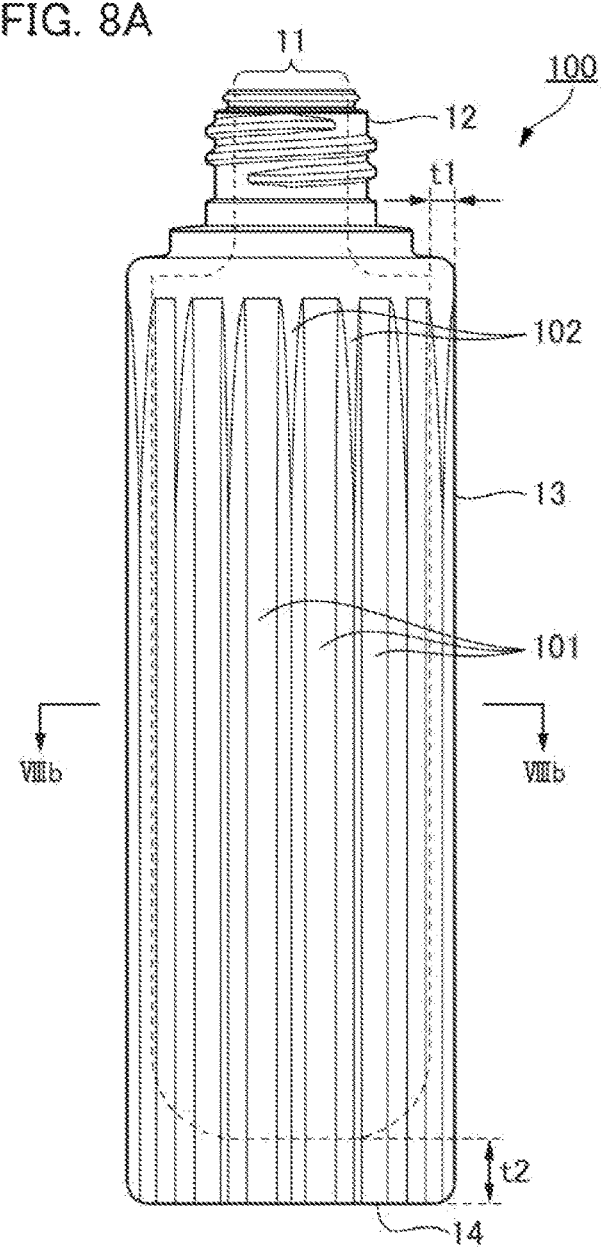
FIG. 8A is a front view of a container according to a second embodiment.
Figure 8B:
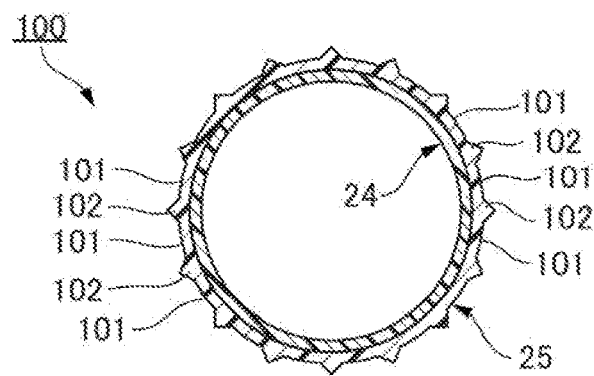
FIG. 8B is a cross-sectional view taken along a line VIIIb-VIIIb of FIG. 8A.

FIG. 8A is a front view of a container 100 according to the second embodiment, and FIG. 8B is a cross-sectional view taken along a line VIIIb-VIIIb of FIG. 8A.

The container 100 shown in FIGS. 8A and 8B is a resin container having a structure in which a first layer 24 facing the container inner surface and a second layer 25 facing the container outer surface are laminated, similarly to the container 10 of the first embodiment, and stores, for example, a beauty lotion, a milky lotion, or the like.

The container 100 includes a neck portion 12 having a mouth portion 11 at an upper end, a cylindrical body portion 13 continuous from the neck portion 12, and a bottom portion 14 continuous from the body portion 13. As indicated by a broken line in FIG. 8A, also in the container 100, similarly to the first embodiment, the thickness t2 of the bottom portion 14 is formed to be thicker than the thickness t1 of the body portion 13. That is, the thickness t1 of the body portion 13 is formed to be considerably thin with respect to the bottom portion 14, and the thickness of the body portion 13 is equalized. By adopting the above-described wall thickness distribution, a luxurious feeling and a heavy feeling are emphasized, and the container 100 can be brought close to an image of a cosmetic container held by a consumer.

As illustrated in FIG. 8A, a plurality of grooves 101 each extending in the axial direction of the container 100 are formed on the outer peripheral surface of the body portion 13 of the container 100. The plurality of grooves 101 have the same shape, and are arranged at equal intervals in the circumferential direction of the container 100.

As illustrated in FIG. 8B, the cross-sectional shape of the groove 101 is formed in a trapezoidal shape in which the groove bottom on the inner peripheral side is substantially flat and the groove width expands in a tapered shape as approaching the outer peripheral side. As illustrated in FIG. 8A, the upper end of the groove 101 is located near the upper end of the body portion 13, and the lower end of the groove 101 faces the bottom portion 14 of the container 100. In the vicinity of the upper end of the groove 101, the depth of the groove 101 gradually decreases toward the upper end side of the groove 101.

Convex portions 102 each extending in the axial direction are formed between the adjacent grooves 101 on the container 100. The cross-sectional shape of the convex portion 102 is formed in a triangular shape in which the width of the convex portion 102 decreases from the inner peripheral side toward the outer peripheral side in the radial direction, and the apex portion on the outer peripheral side forms an acute edge. As a result, the cross-sectional shape of the body portion 13 of the container 100 has a shape in which the grooves 101 and the convex portions 102 are alternately arranged in the circumferential direction.

As described above, by forming the plurality of grooves 101 extending in the axial direction on the body portion 13 of the container 100, it is possible to further enhance the aesthetic appearance of the container 100. As a result, it is possible to obtain the container 100 suitable for a cosmetic container or the like whose appearance is important.

Figure 9A:
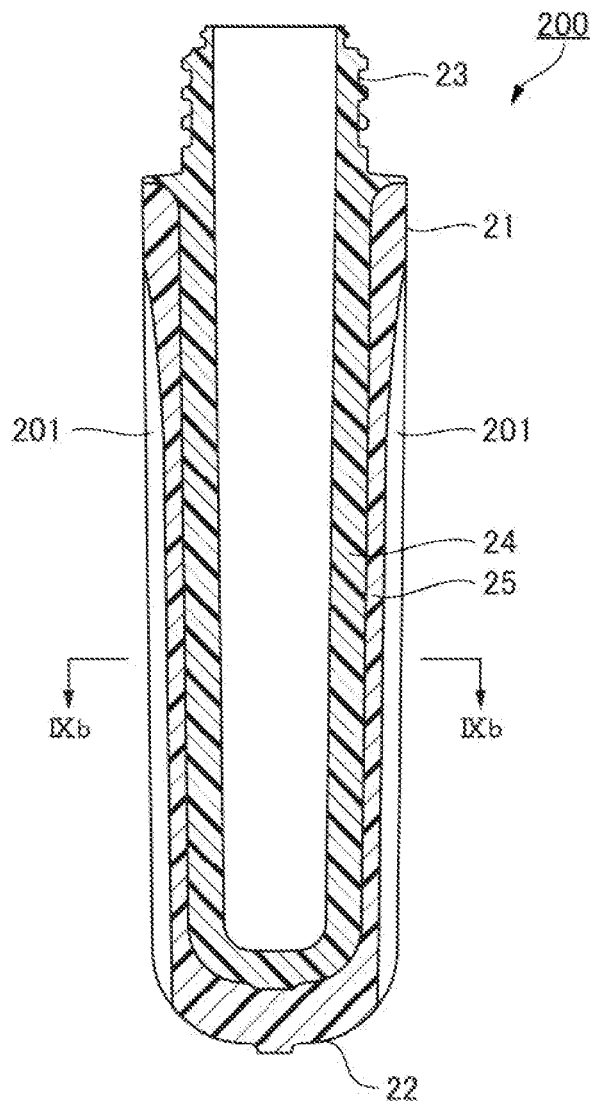
FIG. 9A is a longitudinal sectional view of a preform applied to manufacture of the container according to the second embodiment.
Figure 9B:
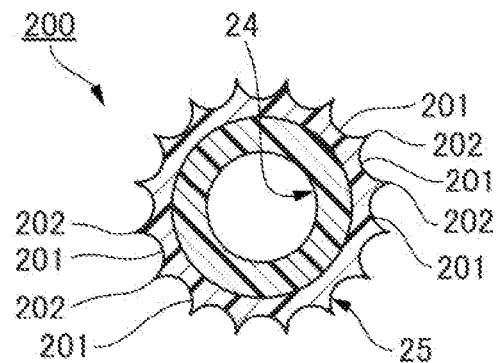
FIG. 9B is a cross-sectional view taken along a line IXb-IXb of FIG. 9A.

FIG. 9A is a longitudinal sectional view of a grooved preform 200 applied to manufacture of the container 100 of the second embodiment, and FIG. 9B is a cross-sectional view taken along a line IXb-IXb of FIG. 9A.

The entire shape of the preform 200 is a bottomed cylindrical shape in which one end side is opened and the other end side is closed. The preform 200 includes a body portion 21 formed in a cylindrical shape, a bottom portion 22 that closes the other end side of the body portion 21, and a neck portion 23 formed in an opening on one end side of the body portion 21.

In addition, the preform 200 has a structure in which the first layer 24 located on the inner peripheral side and the second layer 25 located on the outer peripheral side are laminated. The neck portion 23 is formed of a material of the first layer 24, but in the body portion 21 and the bottom portion 22, the second layer 25 is laminated on the outer periphery of the first layer 24.

The configuration of the first layer 24 in the preform 200 of the second embodiment is similar to that of the first layer 24 of the preform 20 of the first embodiment. In the cross section of the first layer 24, both the inner peripheral surface and the outer peripheral surface are circular.

On the other hand, in the second layer 25 of the preform 200 of the second embodiment, a plurality of grooves 201 extending in the axial direction of the preform is formed on the outer peripheral surface of the body portion 21. The plurality of grooves 201 have the same shape, and are arranged at equal intervals in the circumferential direction of the preform 200.

As illustrated in FIG. 9B, the cross-sectional shape of the groove 201 is formed in a curved surface shape having no corner in the groove, for example, like a semicircular shape. In addition, between the adjacent grooves 201 of the preform 200, a convex portion 202 which has the apex portion on the outer peripheral side forming an acute edge and extends in the axial direction is formed. Each convex portion 202 protrudes radially outward from the bottom of the groove 201. As a result, the cross-sectional shape of the body portion 21 of the preform 200 has a shape in which the grooves 201 and the convex portions 202 are alternately arranged in the circumferential direction. Note that the angle of the apex portion of the convex portion 202 of the preform 200 is set to be smaller than the angle of the apex portion of the convex portion 102 of the container 100.

Also in the second embodiment, the compositions of the materials of the first layer 24 and the second layer 25 may be the same or different. For example, the same resin material (for example, PET) may be used for the first layer 24 and the second layer 25, or different materials may be used. Furthermore, for example, the amount of coloring material (color shade), the type of coloring material (color type), and the like may be changed for each material of the first layer 24 and the second layer 25. Note that the first layer 24 or the second layer 25 may have a property of transmitting light (translucency). As an example, in the preform 200 of the second embodiment, the first layer 24 may be colored and the second layer 25 may be transparent.

The configuration of the blow-molding apparatus 30 applied in the second embodiment is substantially the same as that of the first embodiment except that the injection cavity mold used in the second injection-molding unit 32 and the blow cavity mold used in the blow-molding unit 34 are different in shape. The steps of the method for manufacturing a container in the second embodiment are different from those in the first embodiment in a second injection-molding step (S102 in FIG. 6) and a blow-molding step (S104 in FIG. 6).

In the second injection-molding step (S102 in FIG. 6) of the second embodiment, the intermediate molded body 20A (FIG. 3B) of the first layer 24 obtained in the first injection-molding step is stored in an injection cavity mold (not illustrated) having a shape corresponding to the second layer 25 of the preform 200. Thereafter, a resin material is injected from the second injection device 38 between the outer periphery of the intermediate molded body 20A and the injection cavity mold. As a result, the second layer 25 is formed on the outer peripheries of the body portion 21 and the bottom portion 22 of the intermediate molded body 20A, and the grooved preform 200 illustrated in FIGS. 9A and 9B is manufactured.

Thereafter, the preform 200 is conveyed to the blow-molding unit 34 through a temperature adjusting step (S103 in FIG. 6) in the temperature adjusting unit 33. In the blow-molding unit 34, a blow-molding step (S104 in FIG. 6) of the container 100 is performed. Also in the temperature adjusting step of the second embodiment, as in the first embodiment, the bottom portion 22 of the preform 200 is adjusted to a temperature lower than that of the body portion 21.

Figure 10:
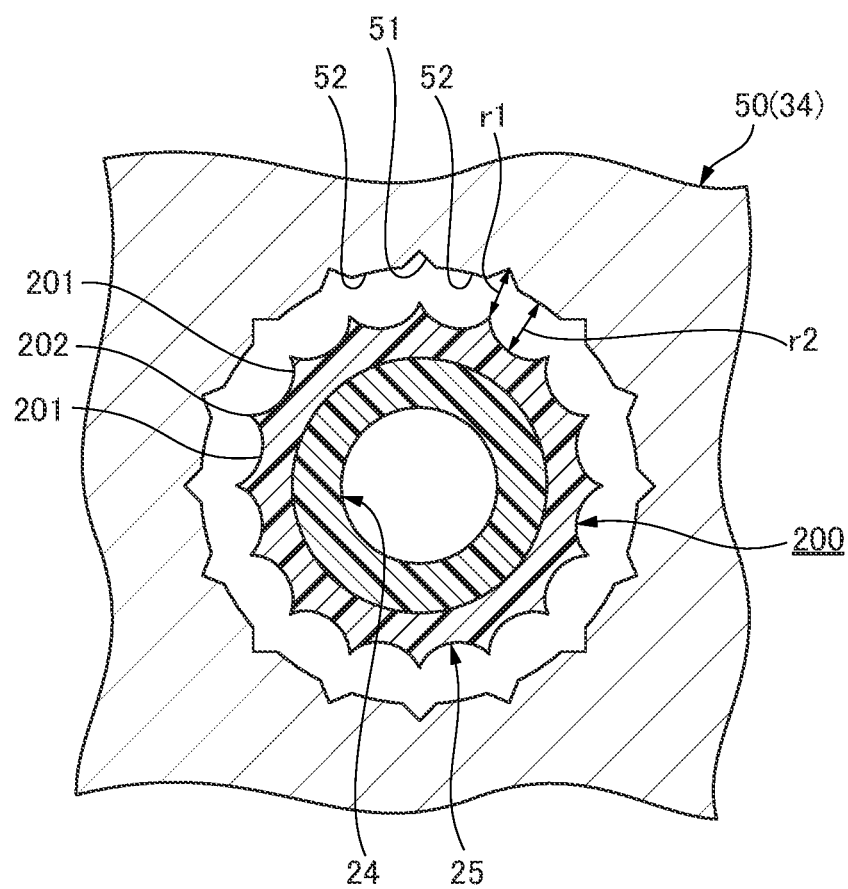
FIG. 10 is a view illustrating a positional relationship between a blow cavity mold and the preform when the blow cavity mold is closed.

In the blow-molding step (S104 in FIG. 6) of the second embodiment, a blow cavity mold 50 having a shape corresponding to the container 100 is closed, and the grooved preform 200 is stored in the mold space. As illustrated in FIG. 10 described later, the shape of the blow cavity mold 50 corresponds to the shape of the container 100. Specifically, a concave portion 51 of the blow cavity mold 50 corresponds to the shape of the convex portion 102 of the container 100, and the convex portion 52 of the blow cavity mold 50 corresponds to the bottom of the groove 101 of the container 100.

FIG. 10 is a diagram illustrating a positional relationship between the blow cavity mold 50 and the preform 200 when the blow cavity mold is closed. Before blow molding, the convex portion 202 of the preform 200 is disposed at a position facing the concave portion 51 of the blow cavity mold 50, and the groove 201 of the preform 200 is disposed at a position facing the convex portion 52 of the blow cavity mold 50. In addition, before the blow molding, an interval r1 in the radial direction between the convex portion 202 of the preform 200 and the concave portion 51 of the blow cavity mold 50 is set to be smaller than an interval r2 in the radial direction between the groove 201 of the preform 200 and the convex portion 52 of the blow cavity mold 50.

By lowering the air introduction member (blow core) with respect to the preform 200 disposed in the above positional relationship with the blow cavity mold 50, the air introduction member is brought into contact with the neck portion 23 of the preform 200. Then, the stretching rod is lowered to hold the bottom portion 22 of the preform 200 from the inner surface, and blow air is supplied from the air introduction member while vertical axis stretching is performed as necessary, and thereby the preform 200 is subjected to horizontal axis stretching. When the preform 200 is bulged due to the introduction of the blow air, the convex portion 202 of the preform 200 enters the concave portion 51 of the blow cavity mold 50, and the groove 201 of the preform 200 is pressed against the convex portion 52 of the blow cavity mold 50 to be shaped into the shape of the container 100.

As described above, before the blow molding, each of the convex portions 202 of the preform 200 is disposed to face the concave portion 51 of the blow cavity mold 50. The convex portion 202 of the preform 200 is thicker in the radial direction than the portion of the groove 201, and the internal heat quantity held by the preform 200 is also larger than the portion of the groove 201. Therefore, the convex portion 202 of the preform 200 is more easily deformed during blow molding than the portion of the groove 201 due to the difference in the internal heat quantity held. That is, when the preform 200 in which the convex portions 202 protruding in the radial direction are periodically formed in the circumferential direction is used, the convex portions 202 of the preform 200 having a large internal heat quantity are flexibly deformed following the concavo-convex shape of the blow cavity mold 50. Therefore, as compared with the case where the container 100 is formed using the cylindrical preform, the use of the preform 200 of the second embodiment makes it possible to form the grooves 101 and the edges of the convex portions 102 of the container 100 sharply, thereby improving the processing accuracy and appearance of the container 100.

The angle of the apex portion of the convex portion 202 of the preform 200 is smaller than the angle of the apex portion of the convex portion 102 of the container 100 (the opening angle of the concave portion 51 of the blow cavity mold 50). Therefore, during the blow molding, the convex portion 202 of the preform 200 having a width narrower than that of the concave portion 51 easily enters the concave portion 51 of the blow cavity mold 50. Therefore, since the convex portion 202 of the preform 200 can be more reliably guided to the space of the concave portion 51 of the blow cavity mold 50, the processing accuracy and appearance of the container 100 can be further improved.

In addition, the interval r1 in the radial direction between the convex portion 202 of the preform 200 and the concave portion 51 of the blow cavity mold 50 is smaller than the interval r2 in the radial direction between the groove 201 of the preform 200 and the convex portion 52 of the blow cavity mold 50. During the blow molding, a portion having a shorter interval in the radial direction can come into contact with the blow cavity mold 50 earlier, so that the convex portion 202 of the preform 200 can be guided to the space of the concave portion 51 of the blow cavity mold 50 before the portion of the groove 201 of the preform 200 reaches the blow cavity mold. This also makes it possible to further improve the processing accuracy and appearance of the container 100.

Furthermore, in the second embodiment, the container 100 is formed by blow-molding the preform 200 including the second layer 25 in which the convex portions 202 are periodically formed in the circumferential direction on the outer peripheral side of the first layer 24 having a cylindrical cross section. Therefore, in the container 100 of the second embodiment, the container inner surface (the inner surface of the body portion 13) becomes a curved surface following the inner surface of the first layer 24 (a curved surface having a circular cross section), and the influence of the unevenness of the container outer surface due to the deformation of the second layer 25 different from the first layer 24 hardly occurs on the container inner surface. For example, when the container 100 in FIGS. 8A and 8B is blow-molded using a single-layer preform, unevenness are likely to occur on the container inner surface due to deformation of the container outer surface of the same layer, but the configuration of the second embodiment can suppress the above event. Therefore, according to the second embodiment, since unevenness are less likely to occur on the inner surface of the container 100, it is possible to manufacture a container in which contents are less likely to remain inside. Further, according to the second embodiment, it is also possible to suppress color unevenness of the container 100 caused by unevenness on the container inner surface.

Also in the blow-molding step of the second embodiment, the body portion 21 having a large internal heat quantity is stretched earlier, and the bottom portion 22 having a small internal heat quantity is stretched later. Therefore, also in the second embodiment, similarly to the first embodiment, the bottom portion 14 of the container 100 shaped by blow molding can be made thick.

As described above, in the second embodiment, the container 100 in which the plurality of grooves 101 extending in the axial direction are regularly formed in the circumferential direction can be manufactured by blow molding using the preform 200 having a laminated structure in which the grooves 201 and the convex portions 202 are alternately formed in the circumferential direction in the second layer 25 on the outer peripheral side. This makes it possible to further improve the designability of the container 100 in addition to the same effects as those of the first embodiment.

The present invention is not limited to the above embodiments, and various improvements and design changes may be made without departing from the gist of the present invention.

For example, the thickness of the body portion or the bottom portion of the second layer 25 (outer layer) of the preform 20 may be set to be thicker than the thickness of the body portion or the bottom portion of the first layer (inner layer) of the preform 20. In other words, the weight of the second layer 25 may be greater than that of the first layer 24.

The release temperature at which the first layer 24 (inner layer) is released from the injection mold by the first injection-molding unit 31 may be set to be lower than the release temperature at which the second layer 25 (outer layer) is released from the injection mold by the second injection-molding unit 32.

As a result, even when a crystalline resin material (PET resin or the like) is used, the first layer 24 (Inner layer, preform 20A) can be sufficiently cooled in the first injection-molding step (first injection-molding unit 31), so that whitening (crystallization by slow cooling) on the contact surface (or contact region) between the first layer (inner layer) and the second layer 25 (outer layer), which is likely to occur from the second injection-molding step (second injection-molding unit 32) to the blow-molding step (blow-molding unit 34), can be easily suppressed. In addition, the internal heat quantity of the second layer 25 (outer layer) can be held higher even after the temperature adjusting step (temperature adjusting unit 33), and the formability of the container 10 in the blow-molding step (blow-molding unit 34) (particularly, the shape of the appearance of the body portion 13 or the bottom portion 14) can also be improved. Furthermore, when the first injection-molding step (first injection-molding unit 31) is set as the rate-determining stage of the molding cycle, and the second layer 25 (outer layer) is released in a higher temperature state in the second injection-molding step (second injection-molding unit 32), the molding cycle can be further shortened.

It should be considered that the embodiments disclosed herein are illustrative in all respects and not restrictive. The scope of the present invention is indicated not by the above description but by the claims, and it is intended that meanings equivalent to the claims and all modifications within the scope are included.

The invention claimed is:

1. An apparatus for manufacturing a resin container, comprising:
   a first injection-molding unit configured to injection-mold a bottomed cylindrical resin intermediate molded body;
   a second injection-molding unit configured to injection-mold a resin material having translucency on an outer side of the intermediate molded body to manufacture a multilayered preform having a resin layer laminated on an outer peripheral side of the intermediate molded body; and
   a blow-molding unit configured to blow-mold the preform to manufacture a resin container having a thick portion,
   wherein, an inner layer and an outer layer of the preform are translucent respectively,
   the second injection-molding unit inserts an injection core mold inside the intermediate molding body,
   in the first injection-molding unit and the second injection-molding unit, a neck portion of the intermediate molded body and a neck portion of the preform are held and transported by a common mold, and
   the apparatus further comprises a conveyance mechanism that comprises the common mold, wherein the apparatus is configured such that even when a mold of the first injection-molding unit is opened, the common mold of the conveyance mechanism is not opened.

2. A method for manufacturing a resin container with the apparatus of claim 1, comprising:
   a first injection-molding of a bottomed cylindrical resin intermediate molded body;
   a second injection-molding of a resin material having translucency on an outer side of the intermediate molded body to manufacture a multilayered preform having a resin layer laminated on an outer peripheral side of the intermediate molded body; and
   blow-molding the preform to manufacture a resin container having a thick portion,
   wherein, an inner layer and an outer layer of the preform are translucent respectively,
   in the second injection-molding, an injection core mold is inserted inside the intermediate molding body,
   in the first injection-molding and the second injection-molding, a neck portion of the intermediate molded body and a neck portion of the preform are held and transported by a common mold, and
   the common mold is comprised in a conveyance mechanism in the apparatus, the apparatus being operated such that even when a mold of the first injection-molding is opened, the common mold of the conveyance mechanism is not opened.

3. The method for manufacturing a resin container according to claim 2, wherein
   the resin container is thicker in a container bottom portion than in a container body portion.

4. The method for manufacturing a resin container according to claim 2, wherein
a composition of a material of a first layer on an inner peripheral side of the preform is different from a composition of a material of a second layer on an outer peripheral side of the preform.

5. The method for manufacturing a resin container according to claim 2, further comprising
adjusting a temperature of the preform manufactured in the second injection-molding before the blow molding, wherein
at least a bottom portion of the preform is locally cooled in the temperature adjusting.

6. The method for manufacturing a resin container according to claim 5, wherein
in the temperature adjusting, a bottom portion of the preform is brought into contact with a second mold adjusted to a temperature lower than a temperature of a first mold facing a body portion of the preform, and the bottom portion of the preform is cooled.

7. The method for manufacturing a resin container according to claim 2, wherein
in the second injection-molding, a grooved preform is manufactured in which the resin layer in which convex portions and grooves respectively extending in an axial direction are alternately arranged in a circumferential direction is formed on the outer peripheral side of the intermediate molded body, and
in the blow-molding, the grooved preform is blow-molded to manufacture a resin container having a plurality of grooves extending in an axial direction on an outer peripheral surface of a container body portion.

8. The method for manufacturing a resin container according to claim 7, wherein
in the blow-molding, the blow molding is performed with the convex portions of the grooved preform facing concave portions of a blow mold.

9. The method for manufacturing a resin container according to claim 8, wherein
an angle of the convex portion of the grooved preform is smaller than an opening angle of the concave portion of the blow mold.

10. The method for manufacturing a resin container according to claim 8, wherein
when the grooved preform is placed in the blow mold, a first interval in the radial direction between the convex portion of the grooved preform and the concave portion of the blow mold is smaller than a second interval in the radial direction between the groove of the grooved preform and the blow mold.

* * * * *